United States Patent [19]

Arai

[11] Patent Number: 5,208,439

[45] Date of Patent: May 4, 1993

[54] LASER BEAM RELAY UNIT

[75] Inventor: Takeji Arai, Yamanashi, Japan

[73] Assignee: Fanuc Ltd, Minamitsuru, Japan

[21] Appl. No.: 474,033

[22] PCT Filed: Aug. 22, 1989

[86] PCT No.: PCT/JP89/00857

§ 371 Date: Apr. 18, 1990

§ 102(e) Date: Apr. 18, 1990

[87] PCT Pub. No.: WO90/02626

PCT Pub. Date: Mar. 22, 1990

[30] Foreign Application Priority Data

Sep. 7, 1988 [JP] Japan ................................. 63-224083

[51] Int. Cl.$^5$ ............................................ B23K 26/06
[52] U.S. Cl. ........................... 219/121.74; 219/121.84; 359/845
[58] Field of Search ........................ 219/121.74, 121.84, 219/121.63, 121.64, 121.75, 121.67, 121.72; 350/610, 623, 618; 359/845

[56] References Cited

U.S. PATENT DOCUMENTS

| 3,731,992 | 5/1973 | Mansell ............................. 359/845 |
| 4,473,074 | 9/1984 | Vassiliadis .................. 219/121.74 X |
| 4,606,620 | 8/1986 | Nagano ................... 350/610 |
| 4,623,229 | 10/1986 | Galan ........................ 219/121.63 X |
| 4,892,991 | 1/1990 | Stadler et al. ................... 219/121.74 |
| 5,079,402 | 1/1992 | Arai ................................. 219/121.74 |

FOREIGN PATENT DOCUMENTS 0284921 3/1988 European Pat. Off.
0375528 12/1989 European Pat. Off.

Primary Examiner—C. L. Albritton
Attorney, Agent, or Firm—Staas & Halsey

[57] ABSTRACT

In a laser beam relay unit for shifting the direction of a laser beam, two reflecting mirrors (31, 37) are placed in parallel to each other and at a predetermined angle relative to incident light, and are fixed to rotatable light guide members (33, 36), respectively. Reflecting-mirror holders (10, 20) are provided in the backs thereof with inlets for cooling air, air retaining sections, and outlets for discharging air. The reflecting mirrors are air-cooled and can be satisfactorily cooled due to the provision of the air retaining sections.

3 Claims, 3 Drawing Sheets

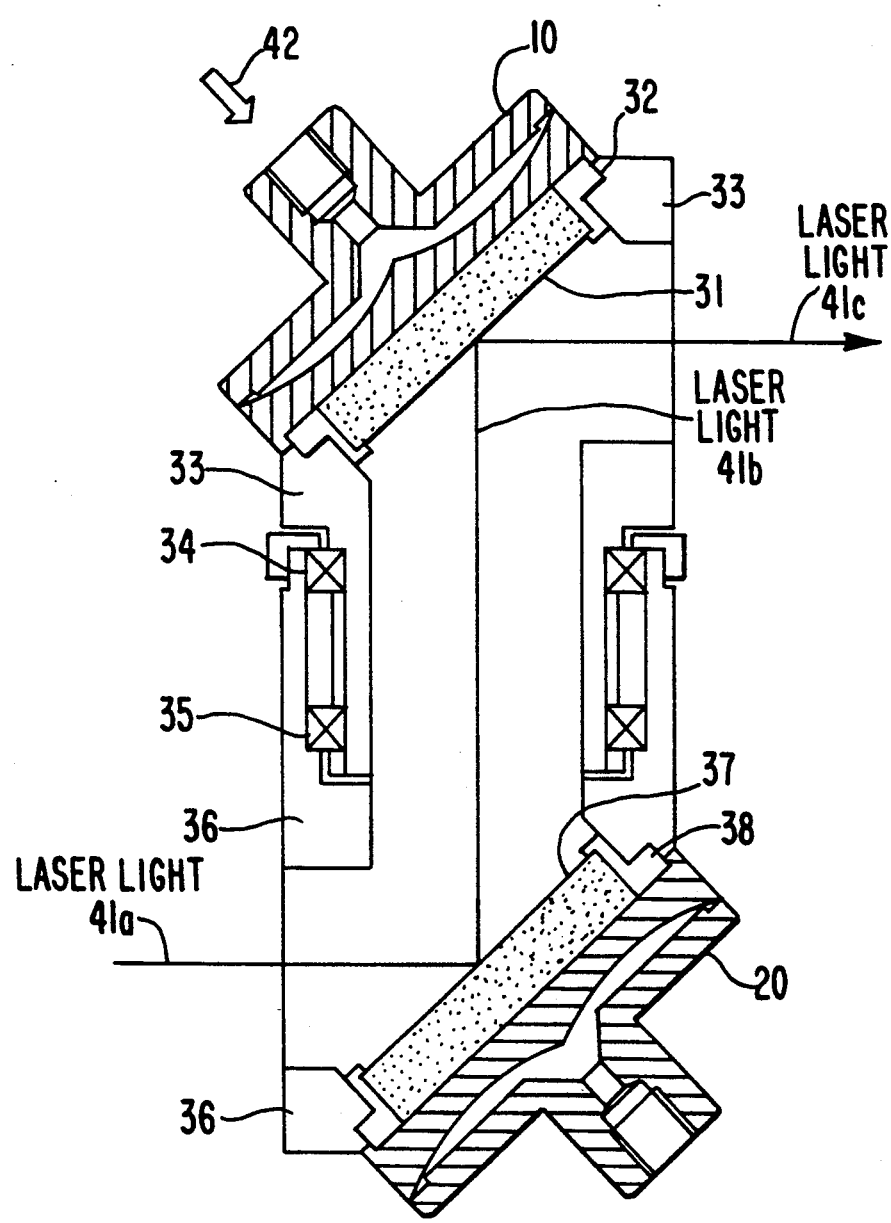

LASER BEAM RELAY UNIT

BACKGROUND OF THE INVENTION

1. Field of the Invention

The present invention relates to a laser beam relay unit for use with a laser beam machine composed of a combination of an articulated robot and a laser oscillator and, more particularly, to a laser beam relay unit using air-cooled reflecting mirrors and having a simple construction.

2. Description of the Related Art

Laser beam machines in which a robot and a laser oscillator are combined are now widely used for welding or the heat treatment of metals. This is because the positioning accuracy of robots has been significantly improved and a laser oscillator can be combined with a commercially available robot to construct a laser beam machine.

With such a laser beam machine, a laser beam must be conducted from a laser oscillator to a wrist along an arm of a robot, and accordingly, a laser beam relay unit must be used to shift the direction of the laser beam somewhere along the path of the beam.

Reflecting mirrors used with the laser beam relay unit absorb a percentage of the laser energy, and therefore, the reflecting mirrors generate heat and become deformed; in some circumstances the thin reflecting films coated on the reflecting mirrors may be destroyed. Accordingly, the reflecting mirrors are usually cooled with water.

Preferably, however, water is not used with robots, because when water is used with a robot, water leakages may occur and water might penetrate the mechanism of the robot, such as the joints, and thus cause unnecessary failures.

SUMMARY OF THE INVENTION

In view of the background art described above, an object of the present invention is to provide a laser beam relay unit using air-cooled reflecting mirrors and having a simple construction.

To attain the above object, there is provided a laser beam relay unit having two reflecting mirrors for shifting the direction of a laser beam, characterized in that the two reflecting mirrors are placed in parallel to each other and at a predetermined angle relative to incident light, and fixed to rotatable light guiding members, and each of the reflecting mirrors is fixed to a reflecting-mirror holder provided in the back thereof with an inlet for cooling air, a retaining section in which air is retained, and an outlet for discharging air.

A laser beam incident on one of the reflecting mirrors is reflected therefrom, passes through the light guide members, and is then reflected from the other reflecting mirror, to thereby change the direction and position of the beam.

The reflecting mirrors are air-cooled and can be satisfactorily cooled because of the provision of the air retaining sections.

BRIEF DESCRIPTION OF THE DRAWINGS

FIG. 1 is a schematic view of a first embodiment of a laser relay unit of the present invention;

DETAILED DESCRIPTION OF THE PREFERRED EMBODIMENTS

Figure 2A:
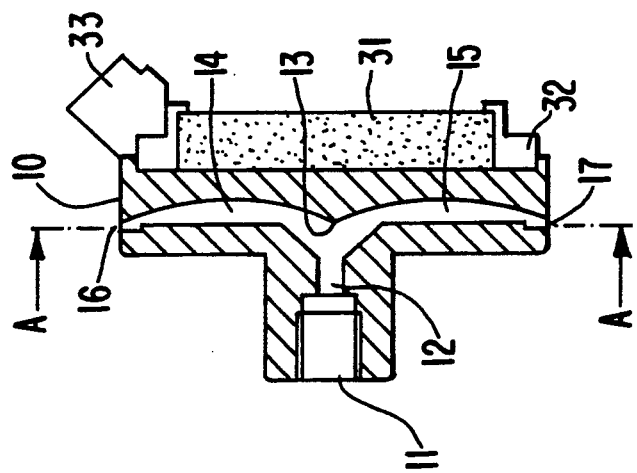
FIG. 2(a) is a detailed schematic view of the reflecting-mirror holders of FIG. 1.

The preferred embodiments of the present invention will be described below with reference to the accompanying drawings.

FIG. 1 illustrates a first embodiment of the present invention, in which a reflecting mirror 31 is fixed to a reflecting-mirror holder 10 by a press member 32. Cooling air 42 is introduced to cool the reflecting mirror 31 as described in detail later. The reflecting-mirror holder 10 is fixed to a light guiding member 33 rotatably coupled to a light guiding member 36 by bearings 34 and 35.

Further, a reflecting-mirror holder 20, to which a reflecting mirror 37 is fixed by press members 38, is fixed to the light guiding member 36.

Incoming laser light 41a from the left of the figure is reflected from the reflecting mirror 37, and the reflected laser light 41b travels upward and is reflected from the reflecting mirror 31 again as outgoing laser light. The light guiding 41c members 33 and 36 are rotatably coupled to each other by the bearings 34 and 35, and thus the direction of the outgoing laser light 41c can be changed from 0 to 360 degrees with the laser light 41b as the axis of rotation. Accordingly, the present invention can be used in a laser beam relay unit for a laser beam machine including a robot.

Figure 2B:
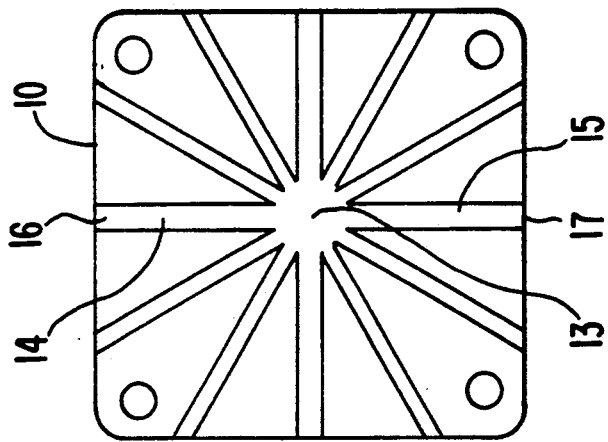
FIG. 2(b) is a sectional view taken along line A—A of FIG. 2(a)

FIG. 2(a) is a detailed schematic view of the reflecting-mirror holder, and FIG. 2(b) is a sectional view taken along the line A—A of FIG. 2(a). In FIG. 2(a), the reflecting-mirror holder 10 is preferably made of a material having a good thermal conductivity, such as brass. In the Figure, 11 designates a cooling-air inlet to which an air pipe can be coupled, and 12 designates a restrictor. The direction of flow of the air is dissected along radial lines of the holder at a height 13, and thereafter, the air is temporarily retained by retaining sections 14 and 15. At this point the air absorbs heat generated by reflecting mirror 13 and is then discharged from discharge openings 16 and 17 to the outside.

The air passages are radially formed as shown in FIG. 2(b). This construction enables the cooling of an amount of heat of several tens of watts generated by the reflecting mirrors of a laser beam machine having an output of several kilowatts, with the cooling air pressure set at 5 kg/cm$^2$.

Figure 3:
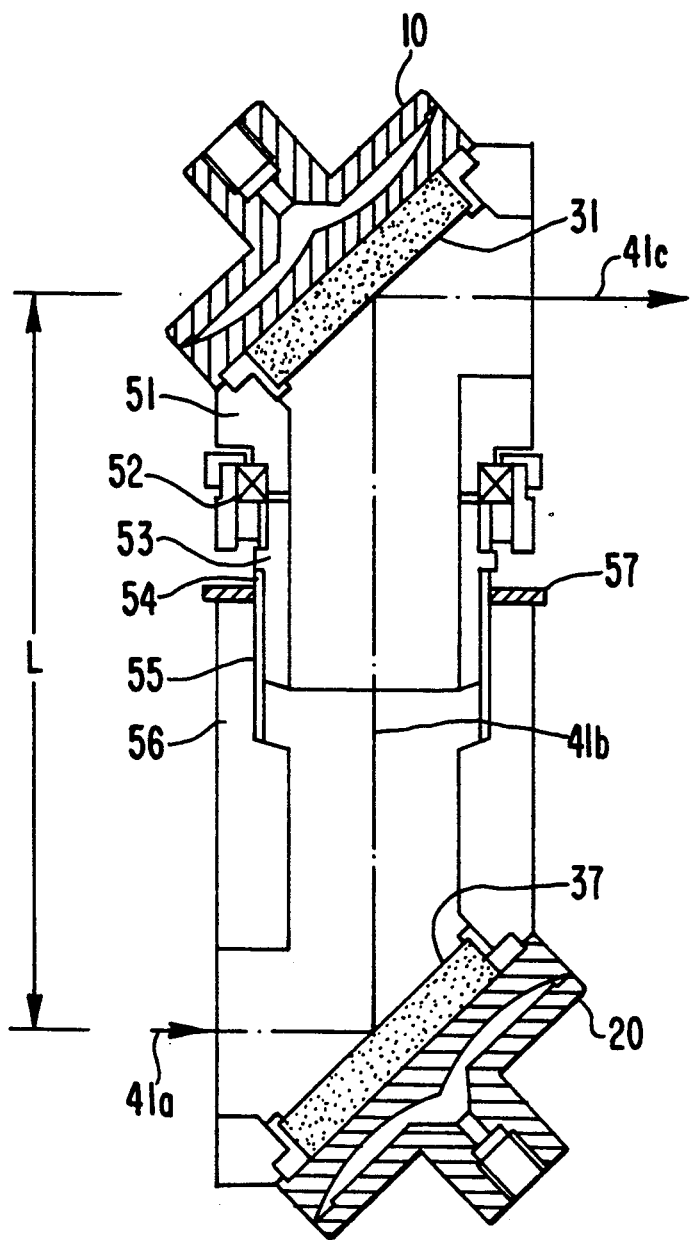
FIG. 3 is a schematic view of a second embodiment of the laser beam relay unit of the present invention.

FIG. 3 illustrates a second embodiment of the laser beam relay unit of the present invention. In the Figure, like reference numerals are used to designate elements corresponding to those in FIG. 1 and therefore, a description thereof is omitted. Different from the laser beam relay unit of FIG. 1, a light guiding member 51 is coupled to a light guiding member 53 through a bearing 52, and the light guiding member 53 is coupled by a male screw 54 inserted to a female thread 55 of a light guiding member 56, whereby a distance L between the reflecting mirrors 31 and 37 can be changed by rotating the light guiding member 53. Reference numeral 57 designates a stopper for positioning the light guiding member 56.

Accordingly, the laser beam relay unit of FIG. 3 can be used with a robot having arms of different lengths, or with different arms of the same robot. Moreover, even if a robots has a poor arm length accuracy, the laser beam relay unit can be installed to fit individual products.

According to the present invention as described above, the reflecting-mirror holders are air-cooled and have a simple construction. Therefore, the laser beam relay unit of the present invention can be widely used as a laser beam relay unit in laser beam machines combined with robots. Further, since the distance between the reflecting mirrors can be easily adjusted, the laser beam relay unit can be installed even if the length of an arm or of a portion of a robot having a difference in level is changed.

I claim:

1. A laser beam relay unit having two reflecting mirrors for shifting the direction of a laser beam, comprising:

two reflecting mirrors disposed parallel to each other and at a predetermined angle relative to incident light, each mirror having a reflecting surface and an opposite rear surface and being mounted on a rotatable light guiding member; and a reflecting-mirro holder provided on the rear surface of each mirror and having an inlet for introducing cooling air, a retaining section in which air is retained comprising a plurality of radially or spirally directed channels connected to the inlet, and radially disposed outlets, each at a radial outer end of one of the plurality of channels.

2. A laser beam relay unit having two reflecting mirrors for shifting the direction of a laser beam, comprising:

two reflecting mirrors disposed parallel to each other and at a predetermined angle relative to incident light, each mirror having a reflecting surface and an opposite rear surface and being mounted on a rotatable light guiding member; and a reflecting-mirror holder provided on the rear surface of each mirror made of a high thermal conductivity solid material and having an inlet for introducing cooling air, a retaining section in which air is retained comprising a plurality of radially or spirally directed channels connected to the inlet, and at least one outlet connected to the retaining section.

3. A laser beam relay unit according to claim 2, wherein the high thermal conductivity material is brass.

* * * * *

UNITED STATES PATENT AND TRADEMARK OFFICE
CERTIFICATE OF CORRECTION

PATENT NO. : 5,208,439

DATED : May 4, 1993

INVENTOR(S) : Arai

It is certified that error appears in the above-identified patent and that said Letters Patent is hereby corrected as shown below:

Col. 2, line 25, "light." should be --light 41c.--;
after "guiding", delete "41c";

line 39, "dissected" should be --directed--;

line 68, "robots" should be --robot--.

Col. 3, line 22, "mirro" should be --mirror--.

Signed and Sealed this

Twenty-first Day of December, 1993

Attest:

BRUCE LEHMAN

Attesting Officer     Commissioner of Patents and Trademarks